(12) United States Patent
Borjesson et al.

(10) Patent No.: US 11,412,083 B2
(45) Date of Patent: Aug. 9, 2022

(54) PORTABLE KEYPANEL FOR INTERCOM SYSTEM

(71) Applicant: Robert Bosch GmbH, Stuttgart (DE)

(72) Inventors: Fredrik Borjesson, Eden Prairie, MN (US); Jason Brchan, Omaha, NE (US); Jim Andersen, Lincoln, NE (US); Kevin B. Moore, Chaska, MN (US); La Ruhe Gene Friesen, Lincoln, NE (US); Keith Jenkins, Lincoln, NE (US); Ralph K. Strader, Minnetonka, MN (US)

(73) Assignee: Robert Bosch GmbH, Stuttgart (DE)

( * ) Notice: Subject to any disclaimer, the term of this patent is extended or adjusted under 35 U.S.C. 154(b) by 1000 days.

(21) Appl. No.: 16/328,568

(22) PCT Filed: Mar. 14, 2017

(86) PCT No.: PCT/EP2017/055935
§ 371 (c)(1),
(2) Date: Feb. 26, 2019

(87) PCT Pub. No.: WO2017/157905
PCT Pub. Date: Sep. 21, 2017

(65) Prior Publication Data
US 2021/0029237 A1    Jan. 28, 2021

Related U.S. Application Data (60) Provisional application No. 62/307,978, filed on Mar. 14, 2016, provisional application No. 62/307,983, filed on Mar. 14, 2016.

(51) Int. Cl.
*H04M 1/725* (2021.01)
*H04M 1/02* (2006.01)
(Continued)

(52) U.S. Cl.
CPC ......... *H04M 1/725* (2013.01); *H04M 1/0202* (2013.01); *H04M 9/001* (2013.01); *H04M 11/025* (2013.01)

(58) Field of Classification Search
CPC ..................................... H04M 1/725
See application file for complete search history.

(56) References Cited

U.S. PATENT DOCUMENTS 5,564,015 A * 10/1996 Bunnell ............. G06F 11/3423
713/340
5,774,537 A    6/1998 Kim
(Continued)

FOREIGN PATENT DOCUMENTS

CN         1229318 C     11/2005
CN       101039347 A      9/2007
(Continued)

OTHER PUBLICATIONS

Examination Report No. 2 from the Intellectual Property Office of Australia for Application No. 2017235284 dated Jun. 28, 2019 (4 pages).
(Continued)

*Primary Examiner* — Hsinchun Liao
(74) *Attorney, Agent, or Firm* — Michael Best & Friedrich LLP (57) ABSTRACT

A mobile intercom device is described that is configured to facilitate the assignment and reassignment of functions during use. A plurality of button pairs, each including a talk button and a listen button, and a display screen are provided on the mobile intercom device. An electronic processor of the mobile intercom device is configured to display a list of alphanumeric identifiers on the display screen, each alphanumeric identifier in the list of alphanumeric identifiers corresponding to a different one of a plurality of channels on the intercom system. A selection of a first alphanumeric
(Continued)

identifier from the list is received and a channel on the intercom system corresponding to the first alphanumeric identifier is assigned to a first button pair of the plurality of button pairs.

20 Claims, 12 Drawing Sheets

(51) Int. Cl.
*H04M 9/00* (2006.01)
*H04M 11/02* (2006.01)

(56) References Cited

U.S. PATENT DOCUMENTS

| | | | |
|---|---|---|---|
| 6,205,338 | B1 | 3/2001 | Kim |
| 7,103,392 | B2 | 9/2006 | Fletcher et al. |
| 7,120,388 | B2 | 10/2006 | Hall |
| 7,123,142 | B2 | 10/2006 | Bohbot et al. |
| 7,400,716 | B1 | 7/2008 | Gibson, Sr. |
| 8,451,232 | B2 | 5/2013 | Tolmasky et al. |
| 8,839,146 | B2 | 9/2014 | Tseng et al. |
| 2003/0134666 | A1* | 7/2003 | Fletcher ............ H04M 1/72513 455/575.2 |
| 2003/0140343 | A1 | 7/2003 | Faivo et al. |
| 2005/0111629 | A1 | 5/2005 | Carlson et al. |
| 2010/0256529 | A1* | 10/2010 | Grasing ................. A61B 7/04 600/586 |
| 2010/0285750 | A1 | 11/2010 | Simonelic |
| 2015/0056974 | A1 | 2/2015 | Kim et al. |
| 2015/0350401 | A1 | 12/2015 | Nishioka et al. |

FOREIGN PATENT DOCUMENTS

| | | |
|---|---|---|
| CN | 203352569 U | 12/2013 |
| JP | 2004179833 A | 6/2004 |
| JP | 2011205227 A | 10/2011 |
| KR | 100730718 B1 * | 6/2007 |
| WO | 2017157905 A1 | 9/2017 |

OTHER PUBLICATIONS

First Office Action from the National Intellectual Property Administration, P.R. China for Application No. 201780017171.7 dated Mar. 11, 2020 (13 pages).

International Search Report and Written Opinion for Application No. PCT/EP2017/055935 dated Jun. 9, 2017 (11 pages).

Clear-Com Communication Systems: "Eclipse Digital Wireless User Manual," Jan. 1, 2007, pp. 1-74, Retrieved from the Internet on Apr. 25, 2017 <URL: http://www.clearcom.com/userfiles/file/User%20Manuals/Wireless/Clear-Com_Eclipse_Beltpack_Manual.pdf>.

"Reference Manual for Tempest 2400 Wireless Intercom System," Jan. 1, 2009, pp. 1-100, Retrieved from the Internet on Apr. 9, 2015 <URL: http://www.clearcom.com/upload/download/Tempest2400_4-channel_User_Manual.pdf>.

Translation of National Intellectual Property Administration, P.R. China, Second Office Action for Application No. 201780017171.7 dated Oct. 30, 2020 (14 pages).

Examination Report No. 3 for Standard Patent Application from the Intellectual Property Office of Australia for Application No. 2017235284 dated Nov. 22, 2019 (4 pages).

* cited by examiner

| | | | |
|---|---|---|---|
|  | 4 | Home | Main operating screen |
|  | 14 | Audio Settings | Audio Settings |
|  | 19 | Microphone Settings | Mic Settings |
|  | 10 | Brightness | Display backlight and LED intensity |
|  | 6 | Alerts | Audio alerts |
|  | 15 | Key Assignments | Menu to set up talk / listen key assignments |
|  | 12 | System Setup | System setup menu |
|  | 4 | Help | Multi-language icon descriptions |
|  | 11 | Scroll List | Use to make calls to anyone in matrix scroll list |
|  | 7 | Battery | Battery State of Charge |
|  | 7 | Hot Mic | Mic is always on |
|  | 14 | DECT Connected | Beltpack has a DECT RF connection with an AP |

*FIG. 9*

| Icon | # | Label | Description |
|---|---|---|---|
| 🔲 | 17 | DECT Disconnected | Beltpack has NO DECT RF connection with an AP |
| ∿ | 16 | Matrix Connected | Beltpack has an Ethernet link to the matrix |
| ∿̸ | 19 | Matrix Disconnected | Beltpack has NO Ethernet link to the matrix |
| 🔒 | 6 | Locked | Locks user out of critical setup functions. |
| 📶 | 15 | Signal Strength | DECT signal Strength |
| 📋 | 18 | Scroll List Loaded | Beltpack has received a scroll list from the Matrix |
| 📋 | 14 | No Scroll List | Beltpack has not received a scroll list from the Matrix |
| ⇅ | 4 | Page | Indicates active key assignment page |
| AUX | 16 | Aux Input Level | Aux input level adjust |

*FIG. 10*

| | | | |
|---|---|---|---|
| [AUX DIM] | 20 | Aux Diminished Level | Aux level reduced when communicating with Matrix |
| [MAX] | 16 | Max Volume Limit | Maximum audio level limit |
| [headset] | 14 | Headset Select | Headset can be plugged into XLR or Aux connector |
| [XLR headset] | 11 | XLR Headset | Headset active on XLR |
| [AUX headset] | 11 | AUX Headset | Headset active on Aux (Aux input disabled) |
| [mic] | 8 | Mic Gain | Microphone preamp gain |
| [headphones] | 14 | Sidetone Level | Headset sidetone level |
| [mic mute] | 14 | Mic Noise Gate | Mute mic below this threshold level |
| [mic on] | 10 | Hot Mic On | Mic always on (even if no talk / listen active) |
| [mic off] | 11 | Hot Mic Off | Mic is on when 1 or more talk switches are active |
| [brightness] | 17 | Button Brightness | Talk / Listen LED intensity |

*FIG. 11*

| | 20 | Front LCD Brightness | Front panel backlight adjust |
|---|---|---|---|
| | 18 | Top LCD Brightness | Top panel backlight adjust |
| | 17 | Front LCD Timeout | Front panel display timeout |
| | 11 | Low Battery | Low battery alert at 10% |
| | 12 | Call Waiting | Alert tone when call comes in on CWW |
| | 17 | DECT Disconnected | Alert tone when DECT RF connection is lost |
| | 19 | Matrix Disconnected | Alert tone when Matrix connection is lost |
| | 20 | Dark Mode Boot Alert | Power on / off tone when running in dark mode |
| | 9 | Key Click | Key click sound in headset |
| | 11 | Alert Level | Level setting for all alert tones |
| | 14 | Assigned Alpha | Key assignment alpha for Talk Level 1 |

*FIG. 12*

| | | | |
|---|---|---|---|
|  | 12 | Apply Change | Press SET to apply change and exit |
|  | 13 | Listen Button | Listen key |
|  | 12 | Talk Level 1 | Talk level 1 |
|  | 12 | Talk Level 2 | Talk level 2 |
|  | 11 | Auto Follow | Listen key = Talk key |
|  | 11 | Auto Listen | Listen key =Talk key and activates with Talk key |
|  | 9 | Auto Mute | Listen key = Talk key and mutes when Talk active |
|  | 15 | Auto Reciprocal | Listen key = Talk key and listen is always on |
|  | 10 | Auto Table | Reserve listen key name for use with IFB Talk key |
|  | 17 | All-Call (Talk 1) | Activates talk paths for all talk keys to the left |
|  | 12 | DIM (Talk 2) | Used with interpanel DIM tables |

*FIG. 13*

| | | | |
|---|---|---|---|
|  | 9 | Page 1..4 | Active Setup Page |
|  | 12 | System Setup | Register a beltpack with a DECT access point. |
|  | 12 | Set Language | Language for help screens |
|  | 11 | Site Survey | Screen to assist with system planning |
|  | 11 | Diagnostics | Screen to troubleshoot RF issues. |
|  | 19 | USB Software Update | Software Update |
|  | 19 | Matrix Disconnected | Matrix connection is down |
|  | 30 | Press SET to Register Beltpack | Begins DECT AP/BP registration process |
|  | 9 | DECT Scan | Waiting for DECT registration |

*FIG. 14*

PORTABLE KEYPANEL FOR INTERCOM SYSTEM

RELATED APPLICATIONS

This application claims the benefit of U.S. Provisional Patent Application No. 62/307,978, filed Mar. 14, 2016, entitled "WIRELESS INTERCOM BELTPACK WITH ICON-DRIVEN DISPLAY," and U.S. Provisional Patent Application No. 62/307,983, filed Mar. 14, 2016, entitled "PORTABLE KEYPANEL FOR INTERCOM SYSTEM," the entire contents of both of which are incorporated herein by reference.

BACKGROUND

The present invention relates to portable devices for intercom systems. Some intercom systems include multiple devices that provide audio communication. Some of the connected devices are portable and are designed to be carried or worn by a user. Other connected devices, such as "keypanels," are not intended to be portable or carried and are instead provided as desktop or rack-mounted units. Because the "keypanel" does not need to be portable, it can often include more buttons, controls, and more advanced display capabilities than the portable devices.

SUMMARY

Various embodiments described herein provide a portable, wireless "beltpack" device for use in an intercom system that provides a level of functionality that is more comparable to the non-portable "keypanel" device. Some such "beltpacks" provide easy access to multiple audio channels and quick, clear identification of those channels. In some embodiments, the beltpack displays the audio channel's alphanumeric name/identifier (i.e., "Alpha") in the user's native language and provides easy answering or responding to calls coming from the intercom.

In one embodiment, the invention provides a mobile intercom device that is configured to facilitate the assignment and reassignment of functions during use. A plurality of button pairs, each including a talk button and a listen button, and a display screen are provided on the mobile intercom device. An electronic processor of the mobile intercom device is configured to display a list of alphanumeric identifiers on the display screen, each alphanumeric identifier in the list of alphanumeric identifiers corresponding to a different one of a plurality of channels on the intercom system. A selection of a first alphanumeric identifier from the list is received and a channel on the intercom system corresponding to the first alphanumeric identifier is assigned to a first button pair of the plurality of button pairs.

In some embodiments, the invention provides a "beltpack"-type device for use with a digital wireless intercom system. The beltpack includes a display screen capable of displaying graphical images. To adjust the settings of the beltpack or to access certain functionalities, the user navigates through an icon-driven graphical user interface displayed on the screen. By utilizing an icon-driven interface instead of a text-based interface, the beltpacks can be used internationally without multiple translations and text-assisted navigation.

In some embodiments, the display fits ergonomically in the beltpack and is large enough and with high enough resolution to show icon detail for a variety of icons. The icons are defined with an international meaning of their function. All of the beltpack functions are indicated by only icons for major operations. Navigation of various menus is also based only on icons, thereby enabling faster navigation by recognition of icons that show both the current position in the menu structure and the functions that are available within the current menu.

Other aspects of the invention will become apparent by consideration of the detailed description and accompanying drawings.

DETAILED DESCRIPTION

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways.

Figure 1:
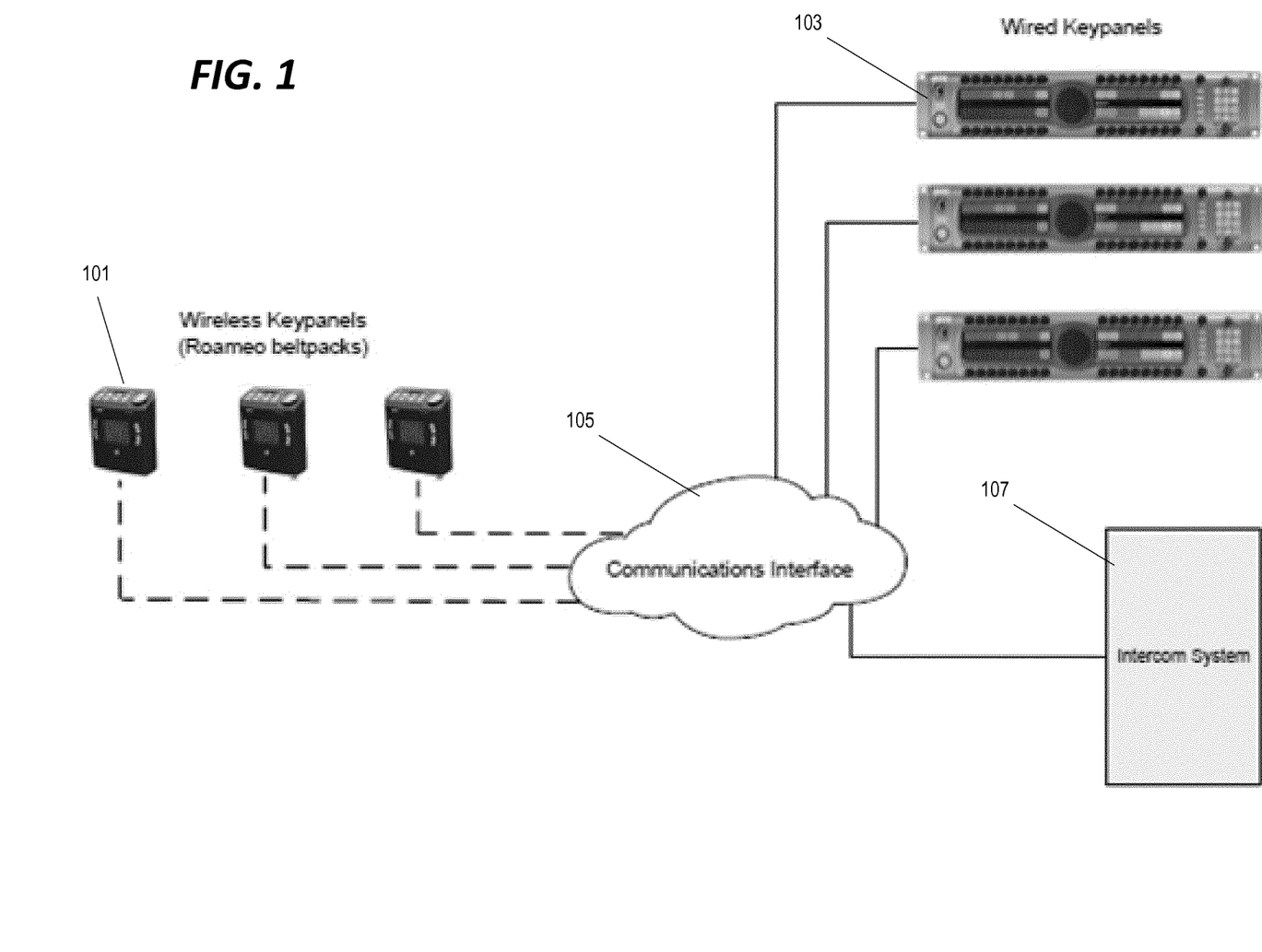
FIG. 1 is a block diagram of a network of devices communicating in an intercom system according to one embodiment.

FIG. 1 illustrates an example of an intercom system with multiple connected devices. In this example, three wireless "beltpack" keypanels 101 and three wired keypanels 103 are all connected to a communications interface 105. Through the communications interface, the beltpacks 101 and the wired keypanels are able to interface with an intercom system 107 and communicate with other connected devices. The wireless beltpacks 101 are portable devices sized and configured to be carried or worn by a user. The wireless belt packs communicate with the communications interface 105 wirelessly using, for example, RF, Wifi, or other wireless communication protocol. The wired keypanels are sized and configured to be rack-mounted or placed on a desk surface. They are not portable and, in this example, are coupled to the communications interface 105 through a wired connection (e.g., CAT-5 or other cabling).

Because the wired keypanels 103 are not designed to be portable, they can be designed to include complex displays, numerous controls, and other user interface elements. However, due to the size limitations of a portable device, the wireless beltpack keypanels 101 must have a physically smaller housing and, as such, the user interface elements must be adapted to accommodate the smaller form factor. In some implementations, this may be accomplished by providing a reduced number of switches on the portable beltpack or by omitting some of the display elements. However, in other implementations, the user interface is adapted on the wireless keypanel 101 to provide functionality that is more comparable to that provided by the wired keypanel 103.

Figure 2A:
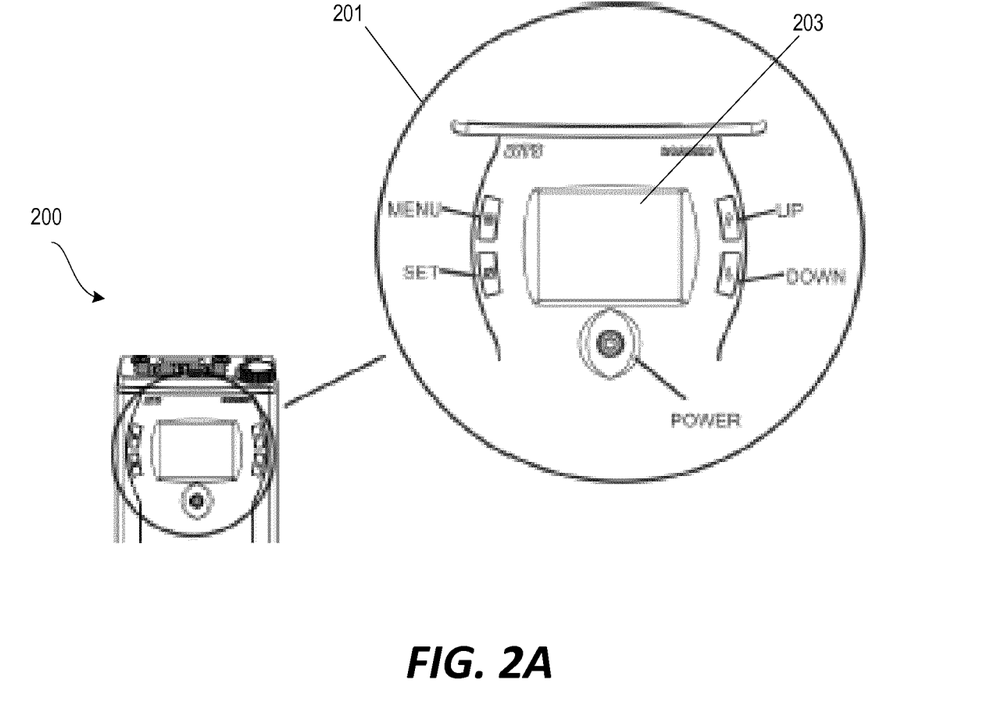
FIG. 2A is a perspective view of an exterior housing of a wireless keypanel beltpack with an inset image of the front face user interface.
Figure 2B:
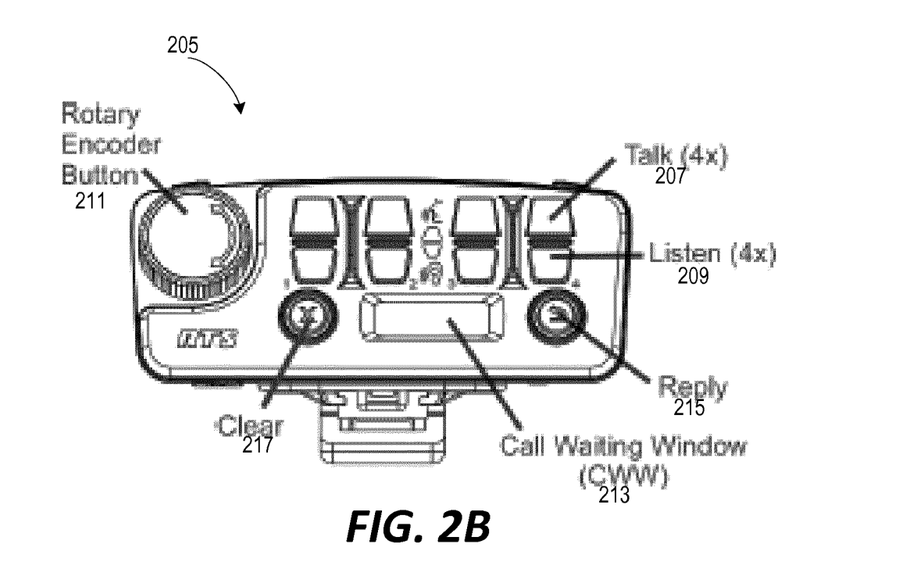
FIG. 2B is an overhead view of the wireless keypanel beltpack of FIG. 2A showing a top face user interface.

FIGS. 2A and 2B illustrate one example of a portable beltpack "keypanel" 200 with a user interface that is designed to provide a robust set of functionality. FIG. 2A shows the user interface elements mounted on a front face surface 201 of the device housing in the inset image. The front face user interface 201 includes a display screen 203, a "MENU" button, a "SET" button, an "UP" button, a "DOWN" button, and a "POWER" button. In this example, the device is turned on by pressing the "POWER" button momentarily and is turned off by holding the "POWER" button for two seconds. Pressing the "MENU" button once activates the LCD backlight of the display screen 203. Once the display screen 203 is lit, pressing the "MENU" button again cycles through various user interface screens on the display screen 203. Pressing and holding the "MENU" button exits the menu structure and returns to a home screen. The "UP" and "DOWN" buttons are used to navigate through the menus and graphical interfaces shown on the display screen 203. Although in this example, the front face surface user interface 201 includes a display screen and a series of buttons, in other implementations, the display screen 201 and the buttons illustrated in FIG. 2A may be replaced with a touch-sensitive screen.

FIG. 2B illustrates the details of various user interface elements positioned on the top surface 205 of the beltpack 200. The top surface user interface 205 includes a series of four "TALK" buttons 207 and four corresponding "LISTEN" buttons 209, a rotary encoder/button control 211, a display screen 213, a "REPLY" button 215, and a "CLEAR" button 217. During use each pairing of a "TALK" button 207 and "LISTEN" button 209 can be assigned to a different channel on the intercom system. Pressing or, in some cases, pressing and holding one of the "TALK" buttons 207 or "LISTEN" buttons 209 allows the user to talk on a particular channel or listen to audio from a particular channel, respectively. The volume of a particular channel can be adjusted by rotating the rotary encoder 211 while holding one of the "LISTEN" buttons 209. Double-tapping the rotary encoder 211 causes the device to enter or exit a "dark mode" which suppresses illumination.

The display window 213—referred to below as the "Call Waiting Window" or CWW 213—indicates when another device not currently assigned to a key is attempting to contact the user. By pressing and holding the REPLY button 215, the user can reply to a waiting "call" from another device. Pressing the "CLEAR" button 217 then releases the current call in the call waiting window 213.

The beltpack device 200 illustrated in FIGS. 2A & 2B provides many of the functions of a full-sized wired keypanel. It provides easy access from the beltpack to multiple audio channels and a quick, clear identification of those channels. In particular, as noted above, the beltpack device 200 includes four "TALK" buttons 207 and "LISTEN" buttons 209. Each pair can be assigned to a different communication channel. For quick identification, an alphanumeric identifier (e.g., an "Alpha") is assigned to each channel on the intercom system. The Alpha corresponding to each channel assigned to one of the four TALK/LISTEN button combinations on the beltpack is displayed in 4, 6, or 8 character formats on the display screen 203 or the CWW window 213. In some implementations, a small display may be provided below the TALK and LISTEN buttons such that the individual buttons identify the corresponding channel. Furthermore, in some implementations, the status screen Alpha assignments and associated "Talk/Listen" indicators shown on the display screen 203 are presented to closely represent the same look and function of the rack mounted or desktop keypanel. In this way, the user experience has commonality between the portable keypanel and all of the other rack mounted/desktop keypanels.

The Alphas are provided in Unicode such that all of the languages available from the intercom can be displayed on the beltpack and, therefore, the audio channel's Alpha is displayed on the beltpack 200 in the user's native language. In some embodiments, the Alpha's for each of the four channels assigned to one of the TALK/LISTEN button pairings are all displayed simultaneously on the display screen 203 and continue to be valid as the user navigates through the various menus provided on the display screen 203. As discussed above, the value for each individual audio channel can be adjusted by rotating the rotary encoder 211 while holding the appropriate "LISTEN" button 209. Furthermore, the "master" volume for the beltpack can be adjusted by rotating the rotary encoder 211 without holding any of the "LISTEN" buttons 209.

To change the communication channels assigned to the beltpack buttons, the user is able to access a list of available audio channels through a menu provided on the display screen 203. In some implementations, the list identifies the available audio channels by their "Alpha." The user scrolls through the list and selects a channel to be assigned to a particular TALK/LISTEN button pairing.

Furthermore, in addition to being able to adjust the specific audio channel assigned to a particular TALK/LISTEN button pairing, in some implementations, the user interface provided on the display screen 203 enables the user to assign other ancillary functions (such as, for example, relays) to one or more of the TALK/LISTEN button pairings. As such, in some implementations, the TALK/LISTEN buttons provided on the top face of the portable keypanel are not necessarily limited specifically to the "talk" and "listen" functions and instead their functionality may be customized based on user preference.

Figure 3:
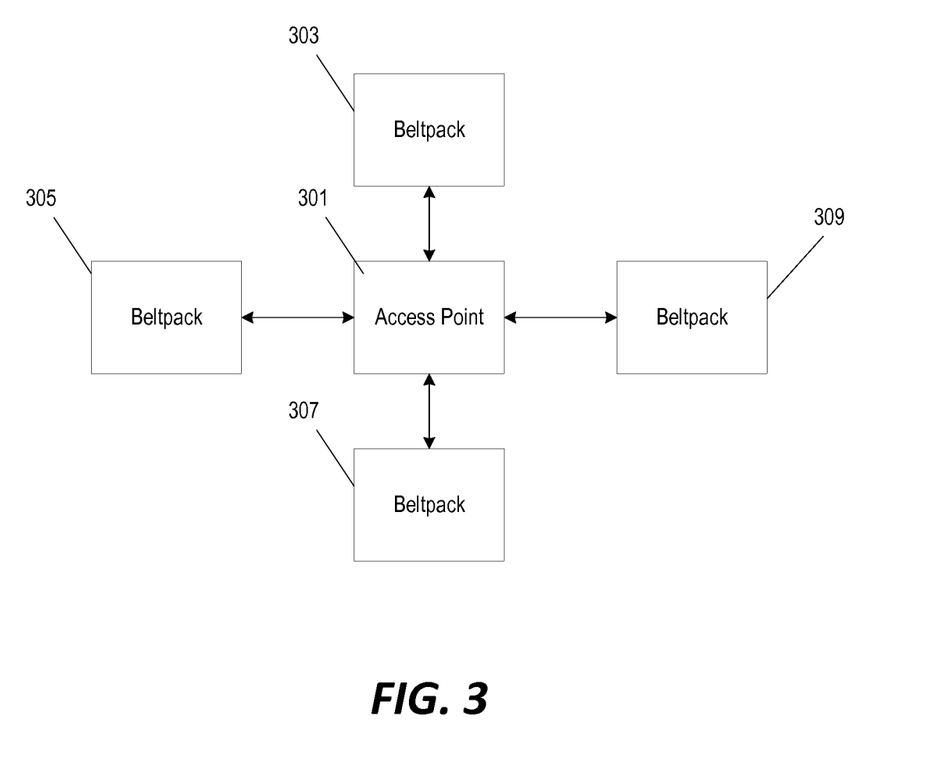
FIG. 3 is a block diagram of an intercom system including an access point and multiple connected beltpack devices according to one embodiment.

FIG. 3 illustrates one example of a wireless intercom system. The system includes an access point 301 and multiple "beltpack" devices 303, 305, 307, 309. Each beltpack device is carried or worn by a different user and used to verbally communicate with one or more other users. Although the example of FIG. 3 shows only a single access point 301, in some implementations, the intercom system can include multiple interconnected access points.

Figure 4:
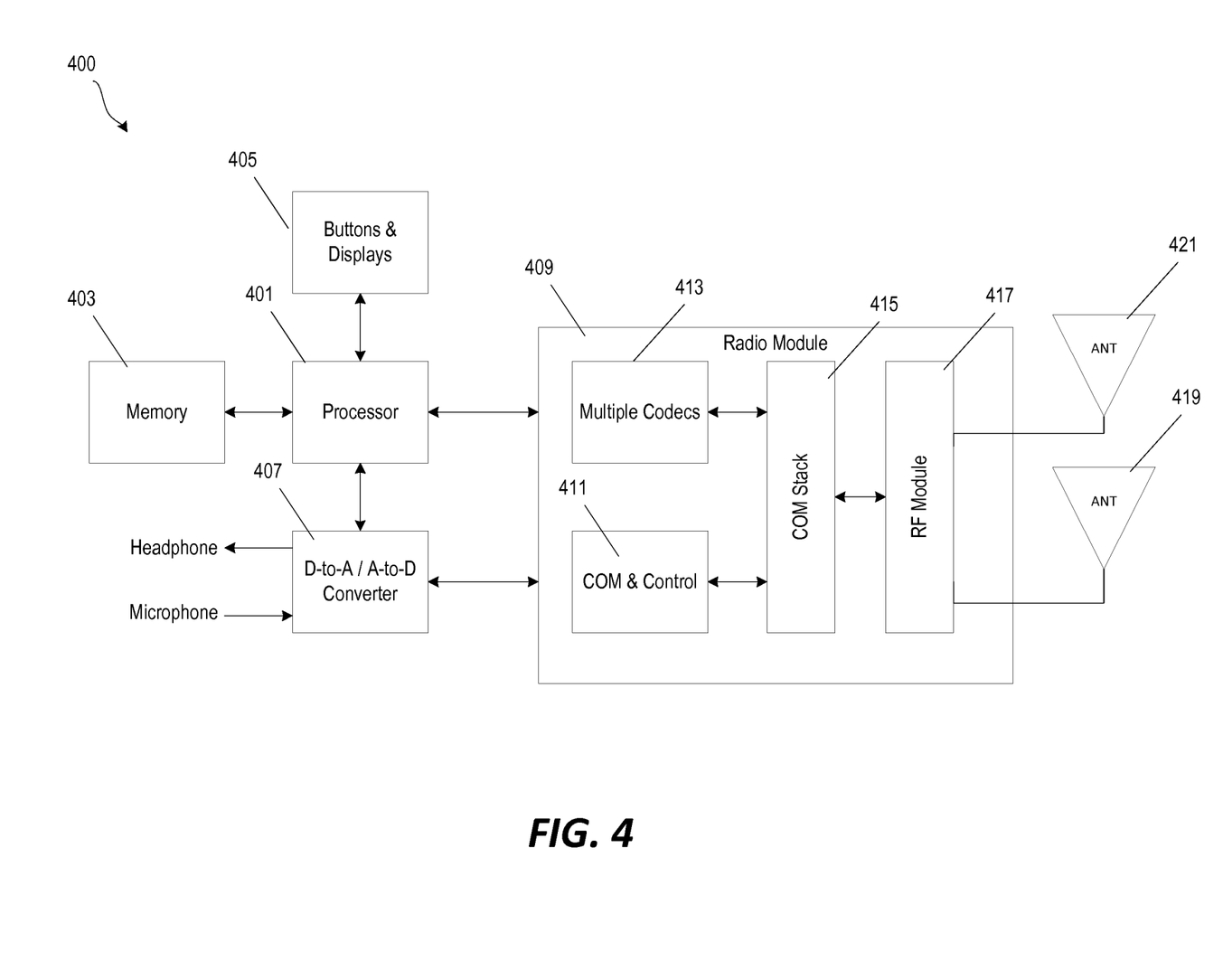
FIG. 4 is a block diagram of a beltpack device connectable to the intercom system of FIG. 3.

FIG. 4 further illustrates the details of one example of a beltpack device 400 connectable to the intercom system through the access point. The beltpack device 400 includes a processor 401 communicatively coupled to a memory 403. The memory 403 stores instructions that, when executed by the processor 401, control the functionality and operation of the beltpack device 400. The beltpack 400 also includes a user interface including one or more buttons and displays 405. The processor 401 is connected to an analog-to-digital/ digital-to-analog converter 407. The converter 407 is connected to a microphone for receiving audio and a headphone for outputting audio.

The beltpack 400 also includes a radio module 409. The radio module includes a COM & Control module 411, multiple stored codecs 413, a COM stack 415, and an RF module 417 communicative coupled to one or more antennas 419, 421.

When the beltpack 400 captures incoming audio through the microphone, the analog audio is converted to digital using one of the stored codecs 413. The codec defines the format and structure of the digital audio stream created by the beltpack device. The digital audio stream is then transmitted through the antenna to an access point and is further transmitted from the access point to one or more other devices connected to the intercom system. Similarly, when a digital audio stream is received by the beltpack 400, the codec is used to "decode" the digital data so that it can be output as analog audio through the headphone.

FIG. 2A (discussed above) illustrates the exterior housing 200 of the beltpack of FIG. 4. Various controls, buttons, and a first display are provided on a top face of the beltpack housing so that they are visible and accessible while the beltpack is being worn. As shown in the inset 201 of FIG. 2A, a further user interface is provided on the front face of the exterior housing of the beltpack. The user interface on the front face includes a graphical display screen 203, a "POWER" button, a "MENU" button, a "SET" button, an "UP" button, and a "DOWN" button.

An icon-driven user interface is displayed on the screen 203 and used to navigate various menus, adjust settings, and access functionality of the beltpack (or the intercom system). In the example of FIG. 2A, the icon-drive user interface is navigated using the up, down, menu, and set buttons as described in further detail below. However, in other implementations, the display screen and the buttons positioned on the front face of the exterior housing of the beltpack might be replaced with a touch-sensitive display screen.

Figure 5:
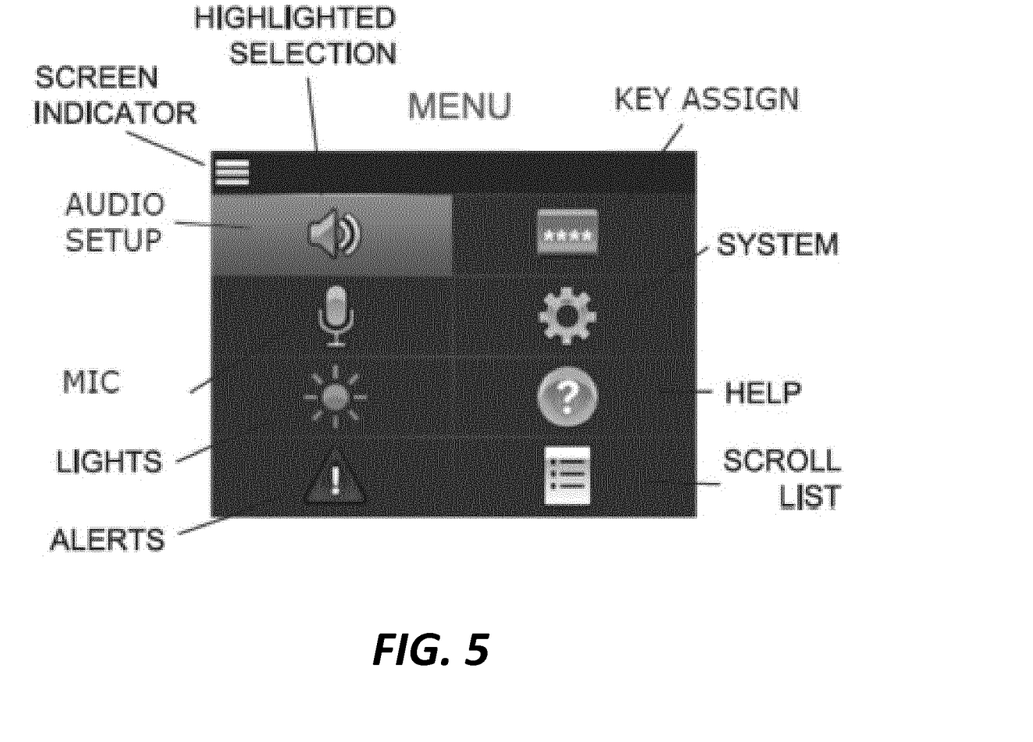
FIG. 5 is a main menu screen of the icon-driven user interface shown on the display screen of the beltpack of FIG. 2A.
Figure 6:
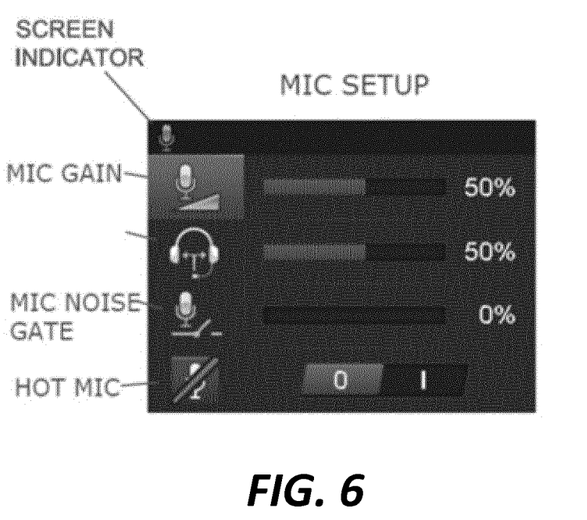
FIG. 6 is a microphone setup screen of the icon-driven user interface shown on the display screen of the beltpack of FIG. 2A.

Upon start-up of the beltpack, a splash screen is displayed followed by a status screen. When the "MENU" button is pressed, the display screen shows a start/home "MENU" screen such as illustrated in FIG. 5. The home MENU screen in this example shows eight icons displayed in two columns of four including an "audio setup" icon, a microphone setup icon, a backlight/brightness setup icon, an "alerts" screen icon, a key assign icon, a system settings icon, a help icon, and a "scroll list" icon. The user presses the up and down buttons to navigate to the desired icon and then presses a "select" or "set" button. For example, if the user selects the "microphone setup" icon (first column, second row), the display screen will show a microphone setup screen such as the one illustrated in FIG. 6. The "microphone setup" screen shows a number of settings that can be adjusted through this sub-menu including microphone gain, system volume, microphone noise gate, and "hot mic." Furthermore, because the "microphone setup" screen is a sub-menu, the screen also include an indicator in the upper left corner indicated the current sub-menu. The user interface returns to the main menu screen when the "MENU" button is pressed on the beltpack.

Figure 7:
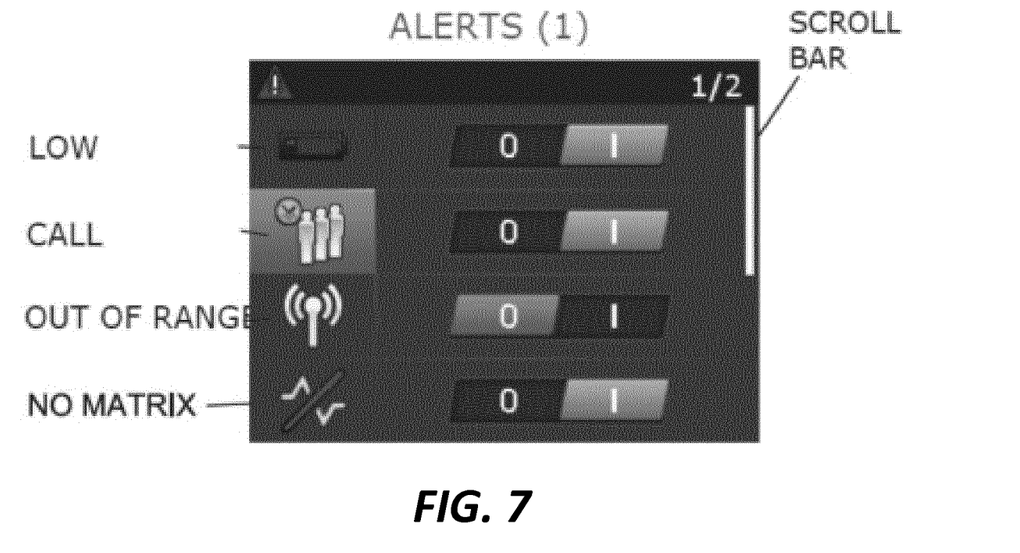
FIG. 7 is a first page of an alerts screen of the icon-driven user interface shown on the display screen of the beltpack of FIG. 2A.
Figure 8:
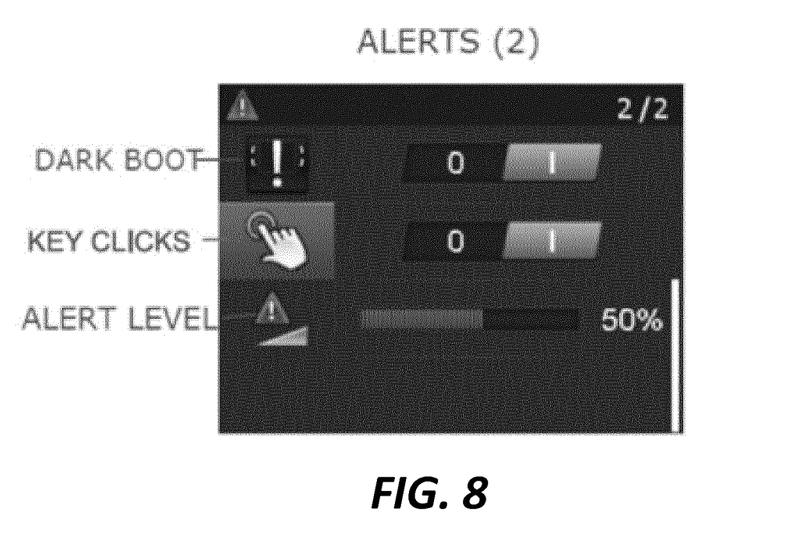
FIG. 8 is a second page of the alerts screen of the icon-driven user interface shown on the display screen of the beltpack of FIG. 2A.
Figure 9:
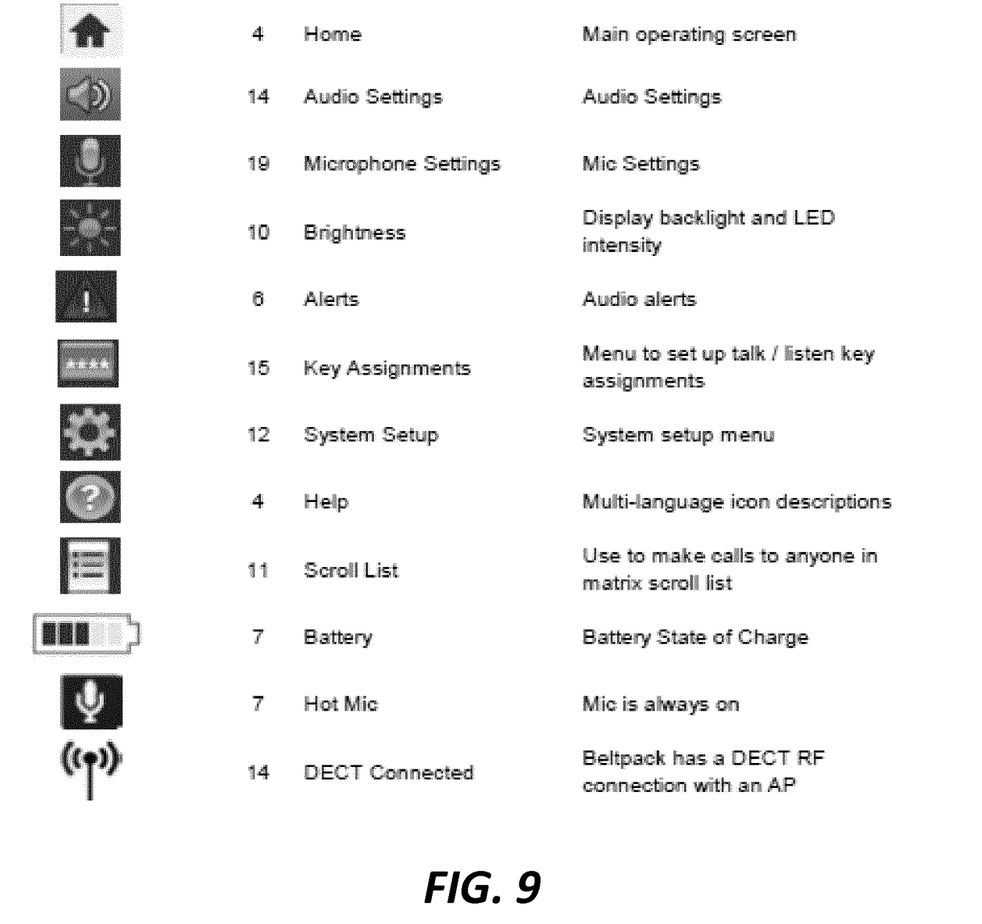
FIGS. 9 through 14 are a series of additional icons included on various pages and menus of the icon-driven user interface shown on the display screen of the beltpack of FIG. 2A.
Figure 10:
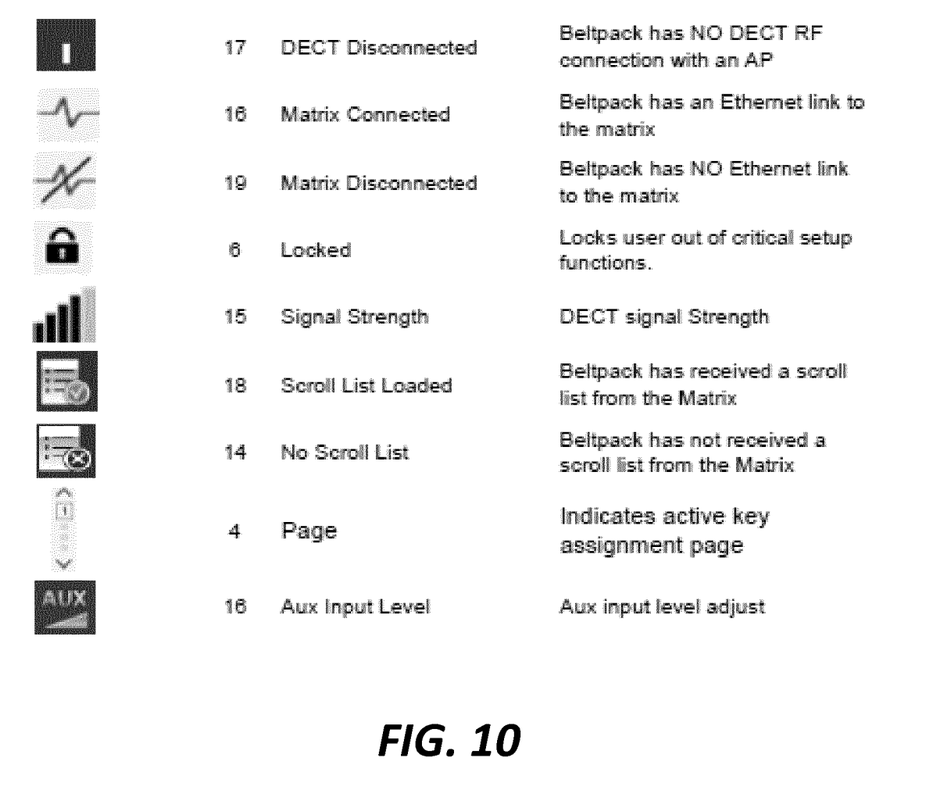
Figure 11:
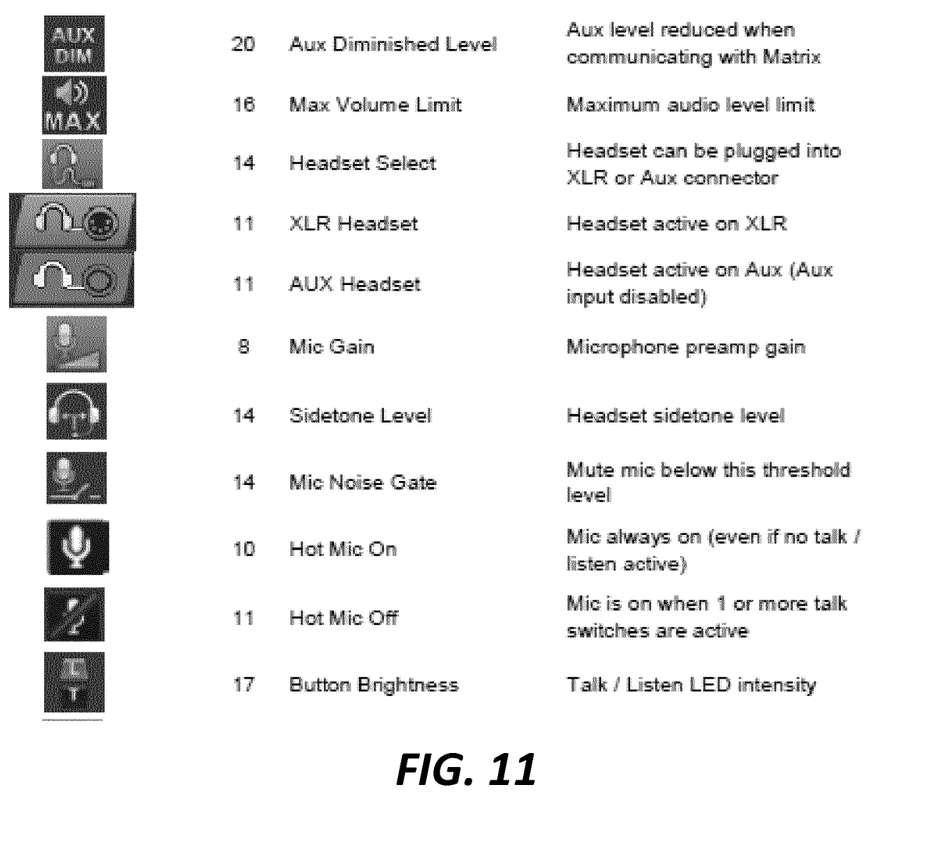
Figure 12:
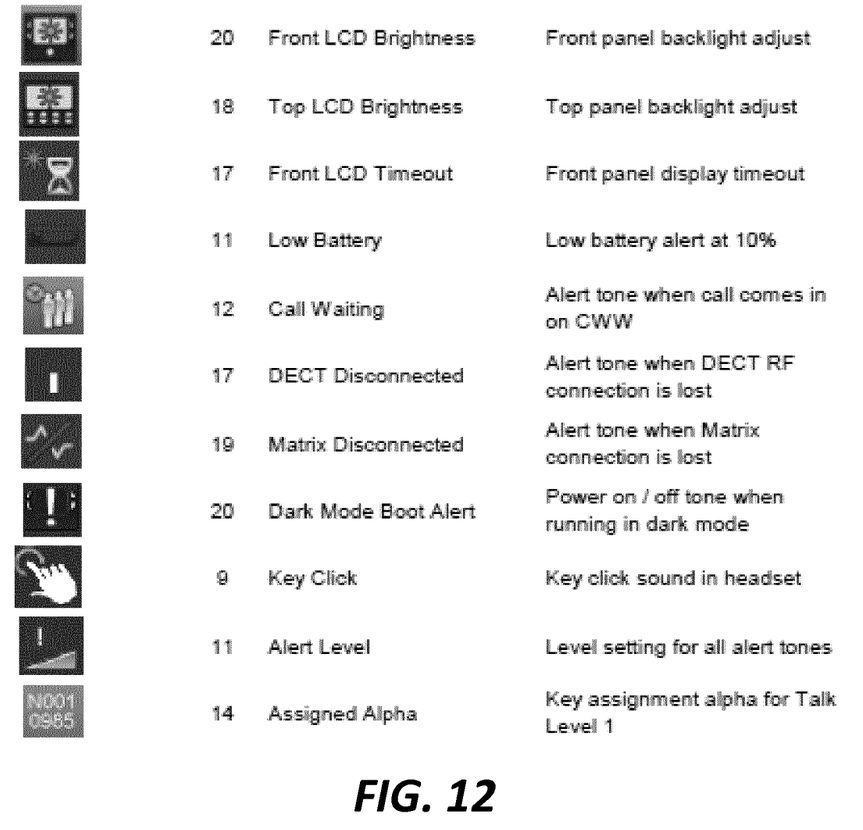
Figure 13:
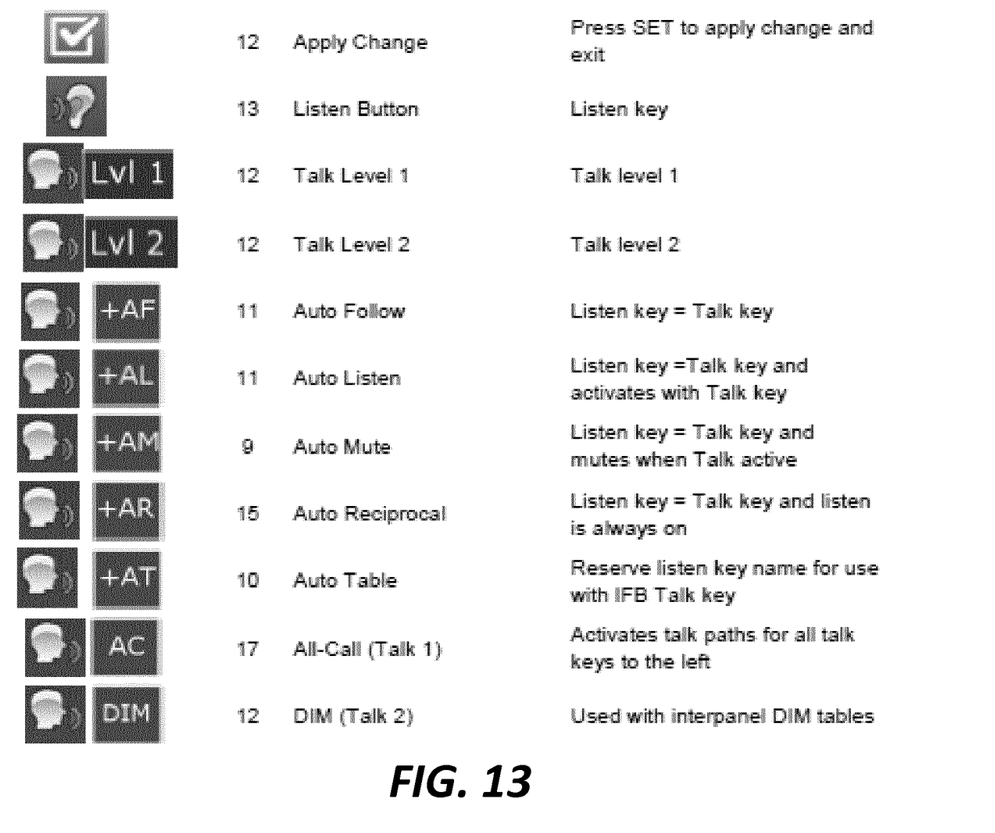
Figure 14:
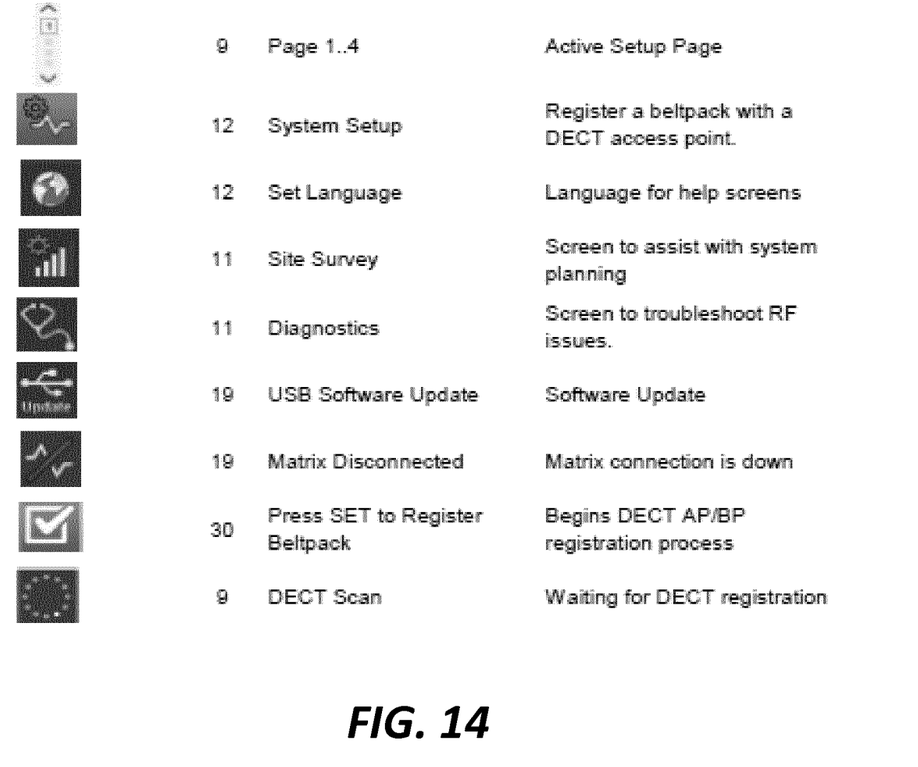

Some selected sub-menus in the icon-driven user interface include multiple pages. For example, if the user selects the "Alerts" screen from the main menu (of FIG. 5), the icon-drive user interface will then first display the "Alerts" screen of FIG. 7. This first page allows the user to select which "alerts" will be activated including "low battery," "call," "out of range," and "no matrix." The numeric indicator in the upper right corner of the screen indicates that the current menu includes multiple pages and the display screen is currently showing only the first page. Using the scroll bar positioned along the right side of the screen, the user can advance to the second page as illustrated in FIG. 8. On this second page, the user can adjust other alert settings.

A variety of other icons and submenus can be incorporated into the icon-driven display discussed above. Other example icons and their associated meaning/functions are illustrated in FIGS. 9-14. However, as noted above, by providing a menu that is navigated primarily or, in some implementations, solely by icons, the beltpack intercom device provides a portable intercom system that can be used by multiple users in multiple different countries speaking multiple different languages without the need for translations and "language" settings. Furthermore, a user can pick up a beltpack device and start using it immediately regardless of her country of origin or spoken language.

Thus, the invention provides, among other things, a portable wireless device for use with an intercom system that replicates much of the robust functionality of the full wired keypanel, but in a smaller form factor for portable use. In particular, some implementation of the beltpack keypanel provide, among other things, separate TALK/LISTEN buttons assigned to particular audio channels, displayed Alphas for each assigned channel in 4, 6, or 8 character format, Unicode format for Alphas such that they can be displayed in a user's native language, separate "CLEAR" and "REPLY" buttons on the belt pack for incoming call responding, the ability to move between pages (lists of preassigned key assignments) which on a user interface while continuing to display the Alphas identifying the channel assigned to each TALK/LISTEN button on the beltpack, the ability to adjust the audio volume on individual channels, and the ability to assign and access any of the available intercom audio channels to the TALK/LISTEN buttons. Various other features and advantages of the inventions are set forth in the following claims.

What is claimed is:

1. A mobile intercom device comprising:
a plurality of button pairs, each button pair including a talk button and a listen button;
a display screen; and
an electronic processor configured to
display a list of alphanumeric identifiers on the display screen, each alphanumeric identifier in the list of alphanumeric identifiers corresponding to a different one of a plurality of channels on an intercom system,
receive a selection of a first alphanumeric identifier from the list of alphanumeric identifiers displayed on the display screen,
assign a channel on the intercom system corresponding to the first alphanumeric identifier to a first button pair of the plurality of button pairs in response to receiving the selection of the first alphanumeric identifier from the list, and
transmit audio stream data from the mobile intercom device to the channel on the intercom system corresponding to the first alphanumeric identifier when the talk button of the first button pair is activated.

2. The mobile intercom device of claim 1, wherein the electronic processor is further configured to
receive a second selection of a second alphanumeric identifier from the list of alphanumeric identifiers displayed on the display screen,
reassign the first button pair to a channel on the intercom system corresponding to the second alphanumeric identifier in response to receiving the second selection of the second alphanumeric identifier from the list, and transmit audio stream data from the mobile intercom device to the channel on the intercom system corresponding to the second alphanumeric identifier when the talk button of the first button pair is activated.

3. The mobile intercom device of claim 1, further comprising a rotary control, and wherein the electronic processor is further configured to assign a new operative function to the talk button of the first button pair in response to the rotary control being adjusted while the talk button of the first button pair is held by a user.

4. The mobile intercom device of claim 1, further comprising a second display screen and a reply button, and wherein the electronic processor is further configured to
receive a call from a second channel on the intercom system,
display a second alphanumeric identifier on the second display screen, the second alphanumeric identifier corresponding to the second channel, and
transmit audio stream data from the mobile intercom device to the second mobile intercom device in response to an activation of the reply button.

5. The mobile intercom device of claim 4, wherein the electronic processor is further configured to
receive a second selection of a third alphanumeric identifier from the list of alphanumeric identifiers displayed on the display screen,
display the third alphanumeric identifier on the second display screen in response to receiving the second selection, and
transmit audio stream data from the mobile intercom device to a third channel of the intercom system in response to an activation of the reply button, the third channel corresponding to the third alphanumeric identifier.

6. The mobile intercom device of claim 1, wherein each alphanumeric identifier in the list of alphanumeric identifiers corresponds to a different user of the intercom system, and wherein the electronic processor is configured to assign the channel on the intercom system corresponding to the first alphanumeric identifier to the first button pair by assigning a channel associated with a user corresponding to the selected first alphanumeric identifier to the first button pair.

7. The mobile intercom device of claim 1, wherein each alphanumeric identifier in the list of alphanumeric identifiers corresponds to a different intercom device connected to the intercom system, and wherein the electronic processor is configured to assign the channel on the intercom system corresponding to the first alphanumeric identifier to the first button pair by assigning a channel associated with a first mobile intercom device corresponding to the first alphanumeric identifier to the first button pair.

8. The mobile intercom device of claim 1, wherein the electronic processor is further configured to
access a plurality of Unicode alphanumeric identifiers, and
determine an operating language of the mobile intercom device,
wherein the electronic processor is configured to display the list of alphanumeric identifiers on the display screen by displaying a list of the Unicode alphanumeric identifiers of the plurality of Unicode alphanumeric identifiers in the determined operating language of the mobile intercom device.

9. The mobile intercom device of claim 1, further comprising a beltpack-type housing, wherein the display screen and the plurality of button pairs are mounted on an exterior of the beltpack-type housing, and wherein the electronic processor is at least partially housed by the beltpack-type housing.

10. The mobile intercom device of claim 1, wherein the electronic processor is further configured to assign a new operative function to the talk button of the first button pair in response to a function selection received through a graphical user interface displayed on the display screen.

11. A method of operating a mobile intercom device, the mobile intercom device including a plurality of button pairs, each button pair including a talk button and a listen button, and a display screen, the method comprising:
displaying a list of alphanumeric identifiers on the display screen, each alphanumeric identifier in the list of alphanumeric identifiers corresponding to a different one of a plurality of channels on an intercom system,
receiving a selection of a first alphanumeric identifier from the list of alphanumeric identifiers displayed on the display screen,
assigning a channel on the intercom system corresponding to the first alphanumeric identifier to a first button pair of the plurality of button pairs in response to receiving the selection of the first alphanumeric identifier from the list, and
transmitting audio stream data from the mobile intercom device to the channel on the intercom system corresponding to the first alphanumeric identifier when the talk button of the first button pair is activated.

12. The method of claim 11, further comprising:
receiving a second selection of a second alphanumeric identifier from the list of alphanumeric identifiers displayed on the display screen,
reassigning the first button pair to a channel on the intercom system corresponding to the second alphanumeric identifier in response to receiving the second selection of the second alphanumeric identifier from the list, and
transmitting audio stream data from the mobile intercom device to the channel on the intercom system corresponding to the second alphanumeric identifier when the talk button of the first button pair is activated.

13. The method of claim 11, wherein the mobile intercom device further includes a rotary control, the method further comprising assigning a new operative function to the talk button of the first button pair in response to the rotary control being adjusted while the talk button of the first button pair is held by a user.

14. The method of claim 11, wherein the mobile intercom device further includes a second display screen and a reply button, the method further comprising:
receiving a call from a second channel on the intercom system,
displaying a second alphanumeric identifier on the second display screen, the second alphanumeric identifier corresponding to the second channel, and
transmitting audio stream data from the mobile intercom device to the second mobile intercom device in response to an activation of the reply button.

15. The method of claim 14, further comprising:
receiving a second selection of a third alphanumeric identifier from the list of alphanumeric identifiers displayed on the display screen,
displaying the third alphanumeric identifier on the second display screen in response to receiving the second selection, and transmitting audio stream data from the mobile intercom device to a third channel of the intercom system in response to an activation of the reply button, the third channel corresponding to the third alphanumeric identifier.

16. The method of claim 11, wherein each alphanumeric identifier in the list of alphanumeric identifiers corresponds to a different user of the intercom system, and wherein assigning the channel on the intercom system corresponding to the first alphanumeric identifier to the first button pair includes assigning a channel associated with a user corresponding to the selected first alphanumeric identifier to the first button pair.

17. The method of claim 11, wherein each alphanumeric identifier in the list of alphanumeric identifiers corresponds to a different intercom device connected to the intercom system, and wherein assigning the channel on the intercom system corresponding to the first alphanumeric identifier to the first button pair includes assigning a channel associated with a first mobile intercom device corresponding to the first alphanumeric identifier to the first button pair.

18. The method of claim 11, further comprising
access a plurality of Unicode alphanumeric identifiers, and
determine an operating language of the mobile intercom device,
wherein displaying the list of alphanumeric identifiers on the display screen includes displaying a list of the Unicode alphanumeric identifiers of the plurality of Unicode alphanumeric identifiers in the determined operating language of the mobile intercom device.

19. The method of claim 11, wherein displaying the list of alphanumeric identifiers on the display screen includes displaying the list of alphanumeric identifiers on a first display screen positioned on a front surface of the mobile intercom device, and
displaying on a second display screen an alphanumeric identifier corresponding to the channel assigned to each button pair of the plurality of button pairs, wherein the second display screen and the plurality of button pairs are positioned on a top surface of the mobile intercom device.

20. A mobile intercom device comprising:
a beltpack-type housing including a front face and a top face, wherein the top face is visible to a user while the beltpack-type housing is being worn by the user;
a first display screen positioned on the front face of the beltpack-type housing;
a second display screen positioned on the top face of the beltpack-type housing;
a plurality of button pairs positioned on the top face of the beltpack-type housing, each button pair including a talk button and a listen button; and
an electronic processor configured to
display a list of alphanumeric identifiers on the first display screen, each alphanumeric identifier in the list of alphanumeric identifiers corresponding to a different one of a plurality of channels on an intercom system,
receive a selection of a first alphanumeric identifier from the displayed list of alphanumeric identifiers,
assign a channel on the intercom system corresponding to the selected first alphanumeric identifier to a first button pair of the plurality of button pairs in response to receiving the selection of the first alphanumeric identifier from the displayed list, and
display on the second display screen multiple alphanumeric identifiers, the multiple alphanumeric identifiers each corresponding to a channel assigned to a different one of the plurality of button pairs, wherein the selected first alphanumeric identifier is displayed on the second display screen in response to assigning the channel on the intercom system corresponding to the selected first alphanumeric identifier to the first button pair of the plurality of button pairs.

* * * * *